US012347977B2

(12) United States Patent
Benzin

(10) Patent No.: US 12,347,977 B2
(45) Date of Patent: Jul. 1, 2025

(54) ROUND PLUG CONNECTOR COMPRISING A SHIELD CONNECTION

(71) Applicant: HARTING Electric Stiftung & Co. KG, Espelkamp (DE)

(72) Inventor: Marian Benzin, Hille (DE)

(73) Assignee: HARTING Electric Stiftung & Co. KG, Espelkamp (DE)

(*) Notice: Subject to any disclaimer, the term of this patent is extended or adjusted under 35 U.S.C. 154(b) by 348 days.

(21) Appl. No.: 17/917,713

(22) PCT Filed: Apr. 12, 2021

(86) PCT No.: PCT/DE2021/100328
§ 371 (c)(1),
(2) Date: Oct. 7, 2022

(87) PCT Pub. No.: WO2021/209091
PCT Pub. Date: Oct. 21, 2021

(65) Prior Publication Data

US 2023/0163531 A1 May 25, 2023

(30) Foreign Application Priority Data

Apr. 15, 2020 (DE) ..................... 10 2020 110 291.7

(51) Int. Cl.
*H01R 13/6582* (2011.01)
*H01R 13/627* (2006.01)
*H01R 13/639* (2006.01)

(52) U.S. Cl.
CPC ..... *H01R 13/6582* (2013.01); *H01R 13/6275* (2013.01); *H01R 13/6277* (2013.01); *H01R 13/639* (2013.01)

(58) Field of Classification Search
CPC ............ H01R 13/6582; H01R 13/6275; H01R 13/6277; H01R 13/639
USPC ......................................... 439/607.1, 607.19
See application file for complete search history.

(56) References Cited

U.S. PATENT DOCUMENTS

| | | | | |
|---|---|---|---|---|
| 3,897,125 A | 7/1975 | Anderson | | |
| 4,423,919 A | 1/1984 | Hillis | | |
| 2001/0055908 A1* | 12/2001 | Bruce | H01R 13/6277 | 439/607.19 |
| 2015/0349468 A1* | 12/2015 | Singer | H01R 4/4881 | 439/607.19 |
| 2019/0013618 A1 | 1/2019 | Barbet et al. | | |

FOREIGN PATENT DOCUMENTS

| | | |
|---|---|---|
| DE | 2528186 A1 | 1/1976 |
| EP | 3203591 A1 | 8/2017 |
| GB | 1032946 A | 6/1966 |

* cited by examiner

*Primary Examiner* — Gary F Paumen
(74) *Attorney, Agent, or Firm* — Smartpat PLC

(57) ABSTRACT

The invention relates to a round plug connector for detachably connecting lines, comprising at least one housing element for receiving at least one insulating body and at least one locking element for detachably connecting to a counter plug connector. The housing element also receives at least one circumferential spring element. The spring element is produced for connecting an electromagnetic shield made from an electrically conductive material and has at least one ring retained in a circumferential recess in the housing element and at least one substantially axial wing.

8 Claims, 4 Drawing Sheets

ROUND PLUG CONNECTOR COMPRISING A SHIELD CONNECTION

TECHNICAL FIELD

The disclosure relates to a round plug connector comprising a shield connection, in particular for round plug connectors with a push-pull locking system.

BACKGROUND

Round plug connectors are needed to connect cables, especially those containing electrically conductive cores, to devices and/or other cables. Particularly in the field of data transmission, cables and plug connectors are required that have a high level of electromagnetic compatibility (EMC). For this purpose, cables and some of the cores they contain are sheathed with conductive wire, wire mesh and/or foil. In order to transmit this shielding with a plug connector, various means are used for shield connection.

In the prior art, resilient elements made of electrically conductive materials are preferably used to transmit an electromagnetic shield from an electrically conductive cable via a plug connector to a mating plug connector.

The use of spring washers is particularly suitable for round plug connectors. The use of corrugated spring washers for shield connection is very particularly popular for round plug connectors.

The disadvantage of using spring washers, including corrugated spring washers, is the lack of application safety for round plug connectors with a so-called push-pull locking system. Due to the operating principle of the locking system, simple spring washers cannot sufficiently ensure that the shield connection is reliably provided also during operation and the vibrations that may occur.

In the priority application for the present application, the following prior art was searched by the German Patent and Trade Mark Office: DE 25 28 186 A1, GB 1 032 946 A and U.S. Pat. No. 4,423,919 A.

SUMMARY

The object of the disclosure is to equip known round plug connectors with a push-pull locking system by an element for shield connection, which is simple and cost-effective to produce and can be used reliably.

The object is achieved by the subject matter of the independent claim.

Advantageous embodiments of the invention are described in the dependent claims and the following description.

One embodiment proposes a round plug connector for detachably connecting lines, comprising at least one housing element for receiving at least one insulating body and at least one locking element for detachably connecting to a mating plug connector. Here, the housing element receives at least one circumferential spring element. The spring element is made of an electrically conductive material for connecting an electromagnetic shield and is distinguished in that the spring element comprises at least one ring held in at least one recess of the housing element and at least one substantially axially extending wing.

The term "lines" preferably refers to electrically conductive cores of a cable. In addition, an optical signal line or a combination of electrically conductive wire and/or optical signal line and/or a fluid line can be used.

The term "housing element" refers in particular to at least one electrically conductive component of the round plug connector, which is located in the connection region to a mating plug connector. Very particularly preferably, the housing element is formed as a metal sleeve. A round plug connector can have various housing elements for connection to a conductor and/or a cable having a conductor, for example a union nut for connecting the round plug connector to a strain relief means and/or a cable outlet.

Plastics cylinders which have at least one through-opening to receive at least one contact element are usually used as insulating bodies. The contact element establishes the connection of the electrical and/or optical and/or fluid transmission with a corresponding contact element. The corresponding contact element is usually located in a mating plug connector corresponding to the round plug connector or in a corresponding add-on housing.

The locking element is understood to be a component that interacts with the mating plug connector in such a way as to prevent an undesired release of the plug connection. The spring element for shield connection according to the invention is particularly advantageous when using a so-called push-pull locking mechanism. Such locking mechanisms are embodied with detent shapes so that the various detent shapes interact with each other when the plug connectors are plugged together. By means of release shapes, for example catch hooks, in at least one of the plug connectors, this connection can be easily released by applying a tensile force to the housing element provided for this purpose. In doing so, the release shapes engage at least one locking element, for example, and release it from the corresponding locking element.

The spring element according to the invention is made of an electrically conductive material. In particular, the spring element is made of metal materials, in particular copper-containing alloys are provided, and the use of copper-beryllium alloys is very particularly preferred.

Within the scope of the disclosure of the invention, a recess is to be understood first of all as at least one radial groove in which at least one ring of the spring element can be inserted. Particularly advantageously, the recess is further embodied with at least one, substantially axially arranged pocket, which is configured to at least partially receive therein the leaf of the spring element.

A preferred embodiment suggests that the wing of the spring element is oriented against the plug-in direction of the round plug connector, so that the ring points in the direction of the mating plug connector. This means that, during a process of plugging the round plug connector to a mating plug connector, the mating plug connector is in any case first guided over the ring of the spring element before the wing of the spring element is reached and contacted.

This embodiment simplifies the process of plugging the round plug connector to a mating plug connector and enables secure contacting of the mating plug connector with the spring element.

A clever embodiment provides that the wing has at least one concave curvature which extends substantially outside an imaginary cylinder of which the base is formed by the inner diameter of the ring.

This means that the wing arranged on the ring is shaped in such a way that it moves away from the housing element and the ring of the spring element. After reaching a maximum deflection, the wing continues to run away from the ring, but at least partially back towards the housing element. This embodiment not only simplifies the process of plugging the round plug connector to a mating plug connector, but also the release process of the plug connection, since locking elements are easily guided over the spring element.

In a clever embodiment, the wing has at least one concave curvature, of which the maximum deflection is substantially outside an imaginary cylinder of which base is formed by the outer diameter of the ring. This embodiment ensures secure contact between the mating plug connector and the spring element. Thus, the shield connection is ensured in a simple and effective manner. Ideally, the wing of the spring element is shaped here in such a way that the round plug connector is in contact with the spring element at two points on the housing element. The first contact point here between the housing element and the spring element is the ring of the spring element. The second contact point is provided when the round plug connector is plugged with a mating plug connector. The highest deflection of the leaf ensures contact between the leaf and the mating plug connector. This contact point in turn presses the wing in the direction of the housing element of the round plug connector, so that the end of the wing comes into contact with the housing element, whereby the second contact point is at least established, preferably reinforced.

A useful embodiment proposes that the spring element has a number of wings identical to the number of locking elements, wherein the number is greater than or equal to two.

Preferably, the spring element is embodied with three, four or five wings. In particular, an embodiment with at least six wings is provided. This embodiment enables both secure locking of the round plug connector with a mating plug connector and a stable shield connection.

A particularly clever embodiment recommends alternating the wings of the spring element and the same number of locking elements circumferentially at the circumference of the housing element. Both the shield connection and the locking of the round plug connector with a mating plug connector are advantageously reinforced in this way. This embodiment is quite particularly advantageous when using a push-pull locking mechanism. In this way, the locking elements and/or the locking shapes of the mating plug connector come reliably into contact both with the locking elements of the round plug connector and with its spring element. In particular, this embodiment provides that a radially circumferential latching hook of the mating plug connector can be brought into locking engagement with the locking elements of the round plug connector, wherein the spring element between the locking elements rests against precisely this latching hook of the mating plug connector and thus ensures the connection of the shield.

One embodiment provides that the spring element is electrically conductively connected to the housing element at least through the ring and is electrically conductively connected to the mating plug connector at least with a deflection of the wing. This embodiment allows installation with reduced installation space, in which the wing is designed to be just long enough for a camber to be integrally molded on. However, the end of the wing is not pressed here against the housing element of the plug connector even in the plugged state. The end of the wing is thus embodied to be free-floating. In particular, this embodiment makes it easier to plug the round plug connector with a mating plug connector.

Particularly preferred is an embodiment in which the spring element is electrically conductively connected to the housing element at least through the ring and at least one end region of the wing and is electrically conductively connected to the mating plug connector at least with a deflection of the wing. In principle, this embodiment is somewhat longer than the previously mentioned embodiment, but offers the advantage of a more secure contact between the round plug connector, or the housing element of the round plug connector, and the inserted mating plug connector.

In an ingenious embodiment, the spring element has at least one ring, the wing of which is arranged on the ring deformed by at least 60° against the plug-in direction. This embodiment enables a tighter fit of the spring element on the housing element of the round plug connector, whereby an embodiment with a free-floating wing can also be used more simply and securely. In particular, a spring element is proposed here, of which the wings are deformed by substantially 90° on the ring. The term 'deform' means in particular bending processes, in particular roll bending, die bending or free bending and/or rounding, but conceivably also rolling. The use of further deforming processes is conceivable and usually known to a person skilled in the art. The result is a ring of the spring element oriented concentrically to the longitudinal axis with at least one wing extending at least substantially axially.

A refined embodiment additionally provides that the spring element is arranged in a recess in the housing element, wherein the ring is inserted in a further recess in the housing element. This means that, in particular in the case of a concentrically oriented ring with an axially oriented leaf, the spring element is substantially received in a recess in the housing element, wherein the ring is arranged in a further recess, in particular a circumferential groove. Due to this recess in the recess, a particularly advantageous contacting of the spring element with the housing element of the round plug connector can be established. In addition, it is easier to arrange a leaf according to the invention in a free-floating manner in the round plug connector.

BRIEF DESCRIPTION OF THE DRAWINGS

An exemplary embodiment of the invention is shown in the drawings and is explained in more detail below. In the drawings.

DETAILED DESCRIPTION

The figures contain partially simplified, schematic representations. In part, identical reference signs are used for like, but possibly not identical elements. Different views of like elements may be scaled differently.

Directional indications such as "top", "bottom", "left", "right", "front" and "back" refer to the various representations and may vary in respect of the elements shown.

Figure 1:
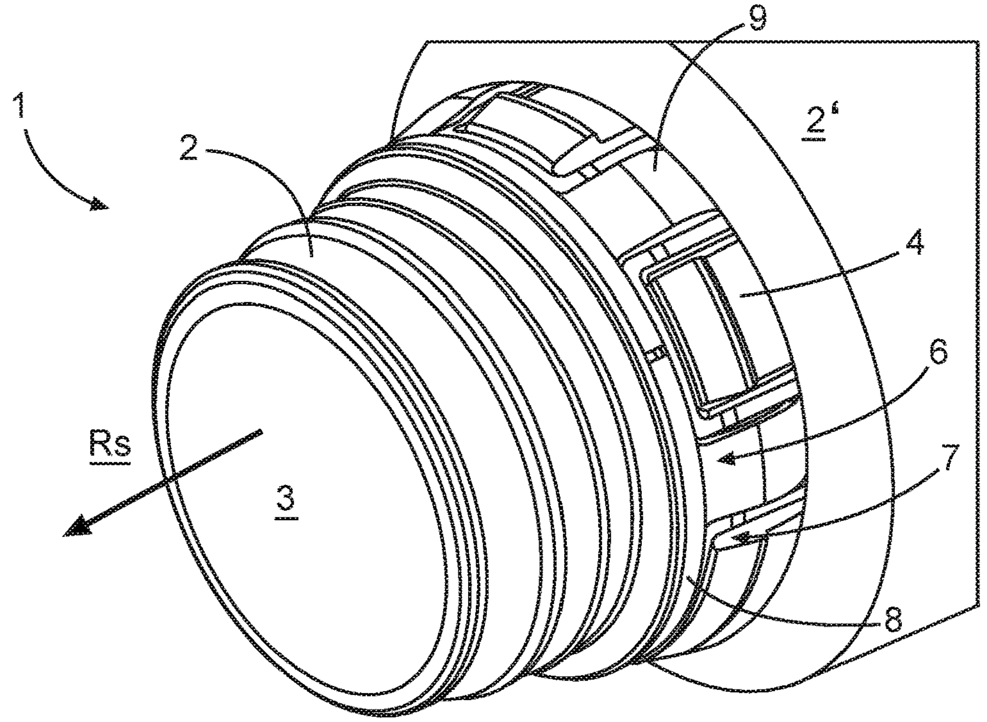
FIG. 1 shows a perspective view of a round plug connector.

FIG. 1 shows the plug-in region of a round plug connector 1 according to the invention, wherein the round plug connector 1 has at least two housing elements 2 and 2'. Here, the housing element 2 receives an insulating body 3. Recesses in the housing element 2 receive the locking elements 4 along the circumference of the housing element 2. The locking elements 4 are formed as detent hooks and are provided for a push-pull locking mechanism. The spring element 6 for shield connection, also received by the housing element 2, can be seen. The spring element 6 is located in a substantially congruent recess 7, wherein a portion of the recess 7 receives a circumferential ring 8 of the spring element 6. The wings 9 of the spring element 6 reside between the locking elements 4 in pocket-like portions of the recess 7. Furthermore, it can be seen that the locking elements 4 and the wings 9 of the spring element 6 alternate circumferentially on the housing element 2. Likewise, it can be seen that the wings 9 arranged on the ring 8 of the spring element 6 are oriented opposite to the plug-in direction $R_S$. In order to separate the locking elements 4 from the spring element 6, webs, which result from the recesses of the locking elements 4 and the recess 7 for the spring element 6, can be seen on the housing element 2 in the illustrated embodiment of the round plug connector 1.

Figure 2:
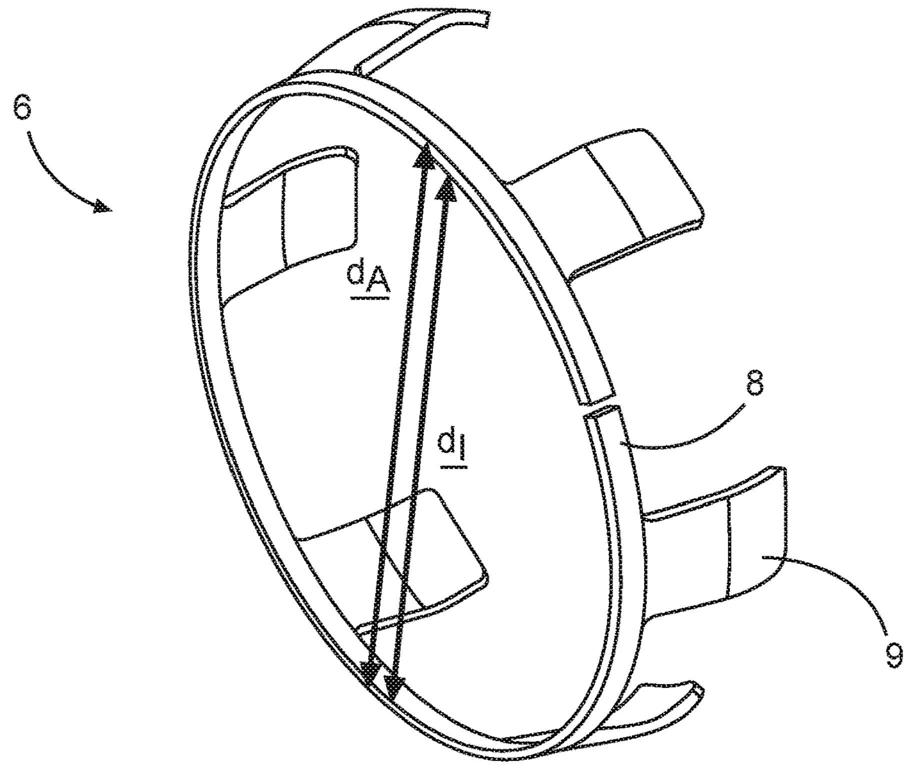
FIG. 2 shows a perspective view of a spring element for shield connection.

FIG. 2 shows a spring element 6 according to the invention, whereby the structure of the spring element 6 can be clearly seen. The spring element 6, which is produced by a stamping process, for example, initially has a ring 8 which has a gap. This gap results from the production process and the following deforming process, for example a rolling process or a roll bending process. The wings 9 provided for contacting the mating plug connector 5 are connected in an integrally bonded manner to the ring 8. For this purpose, the wings 9 are usually integrally molded on during the stamping process, or left on the ring 8. During a deforming process, the wings 9 are given their outwardly directed, concave shape. In principle, the wings 9 can be joined to the ring 8 by integral bonding processes, for example by soldering processes or welding processes. The wings 9 remain substantially outside an imaginary cylinder of which the diameter assumes the inner diameter $d_I$ of the ring. The wings 9 have one end each, wherein in a preferred embodiment the ends remain inside an imaginary hollow cylinder, the base of which can be represented substantially by the outer diameter $d_A$ and the inner diameter $d_I$ of the ring 8.

Figure 3:
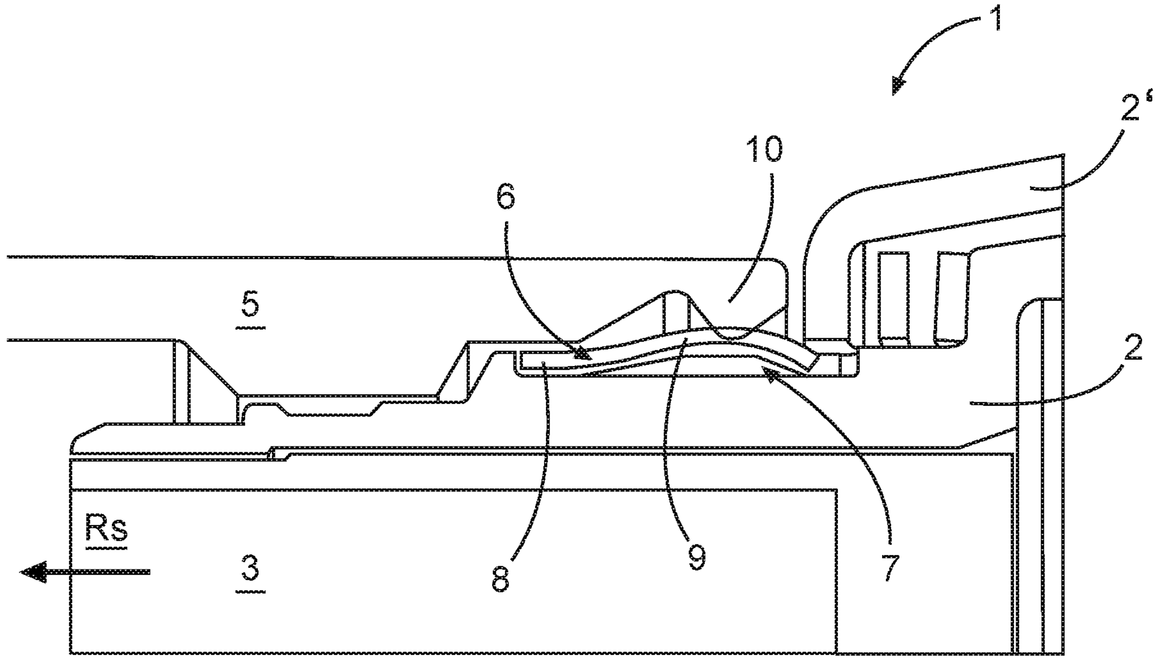
FIG. 3 shows a partial section focusing on the shield connection with a spring element comprising a concave wing in the plugged state.
Figure 4:
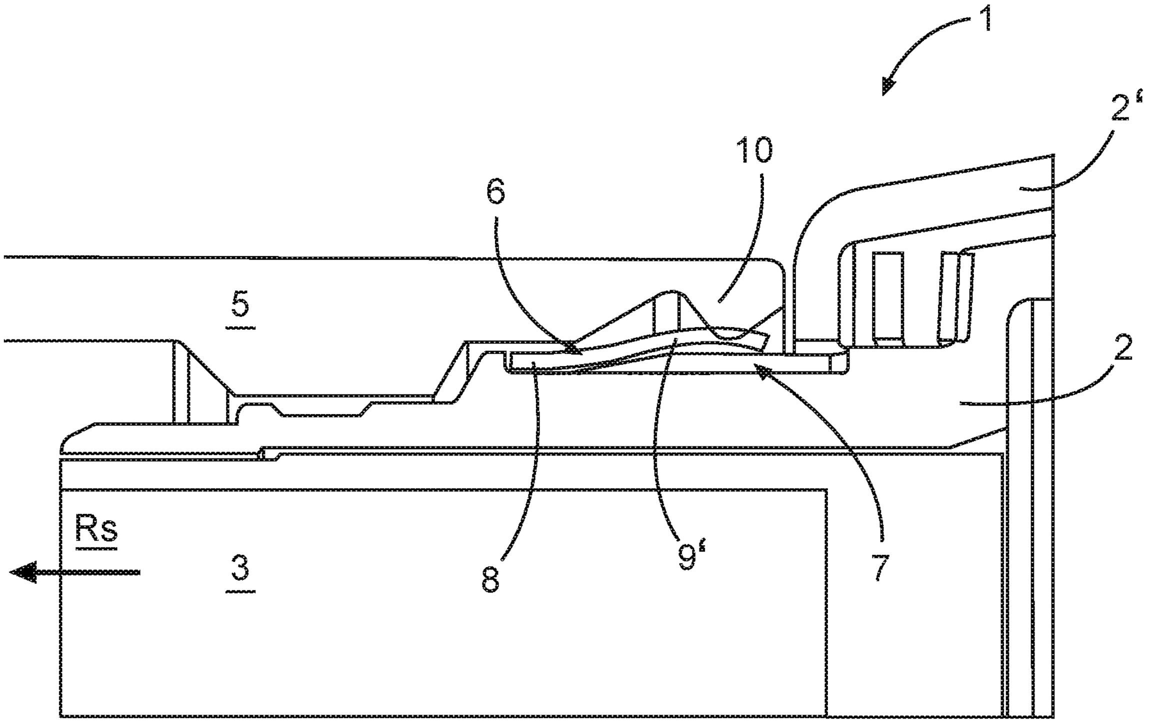
FIG. 4 shows a partial section focusing on the shield connection with a spring element comprising a concave, floating wing in the plugged state.
Figure 5:
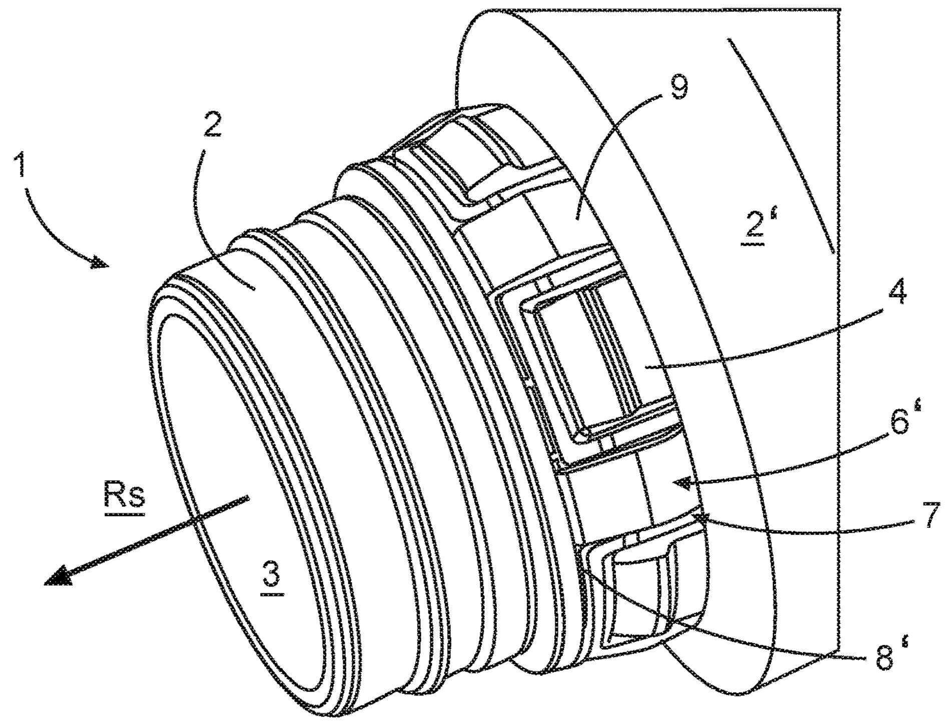
FIG. 5 a perspective view of an alternative round plug connector.
Figure 6:
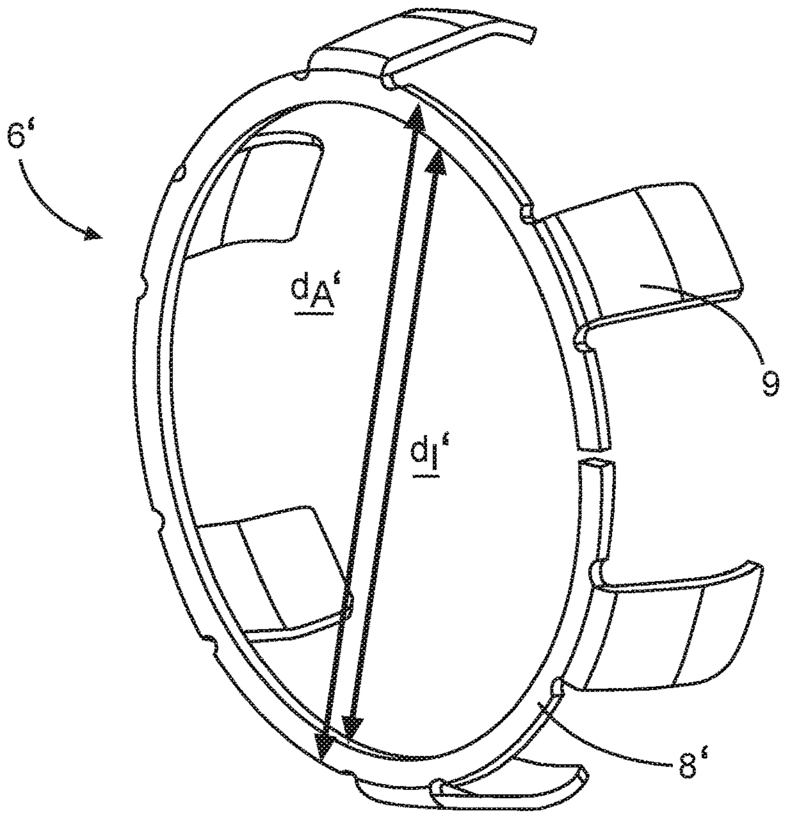
FIG. 6 a perspective view of an alternative spring element for shield connection.
Figure 7:
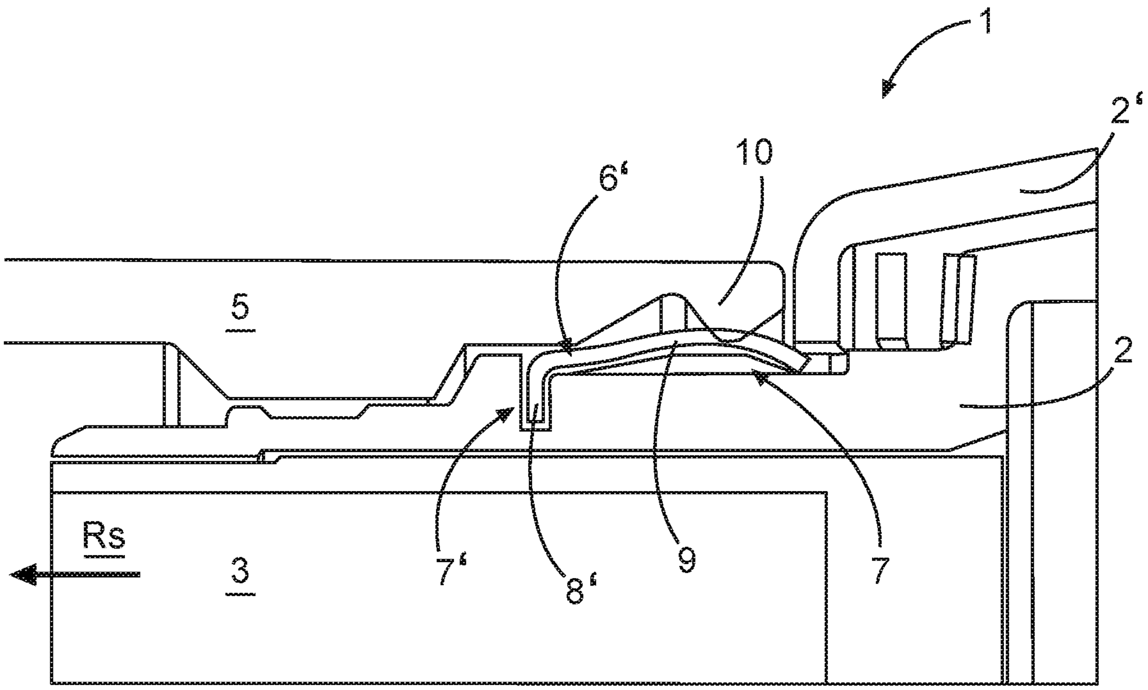
FIG. 7 a partial section focusing on the shield connection with an alternative spring element, comprising a concave wing in the plugged state.
Figure 8:
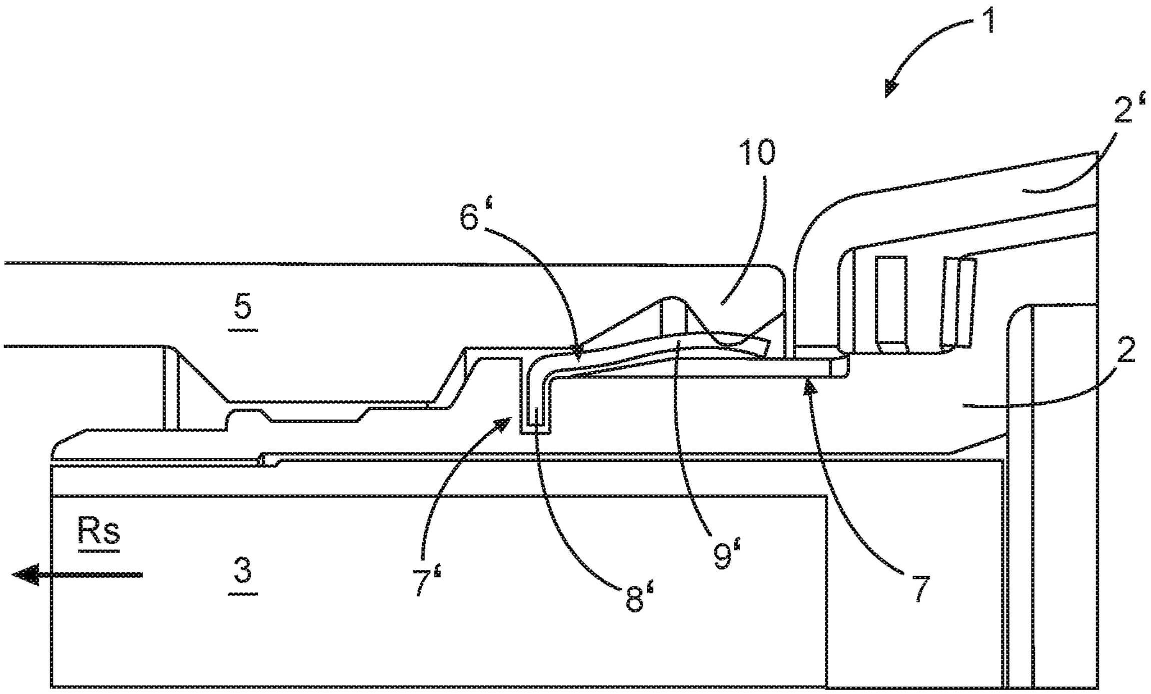
FIG. 8 a partial section focusing on the shield connection with an alternative spring element, comprising a concave floating wing in the plugged state.

FIG. 3 and FIG. 4 show a fundamentally comparable construction of a plug connection, comprising a plug connector 1 and a mating plug connector 5. However, the embodiments of the spring elements 6 differ. In FIG. 3, the spring element 6 is shown with a wing 9, which extends from the ring 8 to the housing element 2'. The end of the wing 9, which is arranged opposite to the plug-in direction $R_S$, comes into contact with the housing element 2 at least to some extent. In FIG. 4, a shorter wing 9' is shown compared to the wing 9. This wing 9' does not contact the housing element 2. The spring element 6 contacts the housing element 2 only through the ring 8. Despite the shortened design, the wing 9' is held in a secure position on the housing element 2 by the ring 8 and can provide a similarly secure shield connection. The concave shape of the differing wings 9 and 9' of the spring elements 6 is particularly clear in both figures. Similarly, FIGS. 3 and 4 illustrate why the concave wings 9 and 9' simplify the plugging process between the round plug connector 1 and the mating plug connector 5. The latching hook 10 in the mating plug connector 5 is slid over the wings 9 and 9' by the concave embodiment of the spring elements 6. Both during the plugging process and during the release process of the plug connection, the spring elements 6 do not inhibit the processes or inhibit them at least only to a reduced extent.

FIGS. 5 to 8 illustrate an alternative embodiment of the round plug connector 1, initially showing a substantially identical structure of the round plug connector 1. However, the alternative embodiment of the spring element 6' also necessitates a change in the housing element 2. Since the spring element 6' has a ring 8', which is reminiscent of a retaining ring in terms of shape and orientation, it makes sense to provide the recess 7 with a further recess 7'. For this purpose, it is convenient to form the recess 7' as a groove substantially congruent to the ring 8'. To ensure that the wings 9 continue to run substantially axially, they must be deformed on the ring 8'. A sag bending process is suitable for this purpose. In order for the wings 9 to continue to be substantially axially oriented on the housing element 2 of the round plug connector 1, the wings 9 must be integrally molded on the ring 8' with at least one angle of greater than or equal to 45°. Particularly preferably, an angle of greater than or equal to 60°, in particular an angle of substantially 90°, is selected. The ring 8' engaging in the recess 7', which is preferably embodied as a groove, secures the spring element 6' in the axial direction in a particularly advantageous manner.

Even though various aspects or features of the invention are shown in each case in combination in the figures, it is apparent to a person skilled in the art—unless otherwise indicated—that the combinations shown and discussed are not the only possible ones. In particular, corresponding units or feature complexes from different exemplary embodiments may be interchanged with each other.

The articles "a" and "an" as used in this application should generally be construed to mean "one or more" unless specified otherwise or clear from context to be directed to a singular form.

LIST OF REFERENCE SIGNS

1 round plug connector
2 housing element
3 insulating body
4 locking element
5 mating plug connector
6 spring element
7 recess
8 ring
9 wing
10 detent hook
$R_S$ plug-in direction
$d_A$ outer diameter
$d_I$ inner diameter.

The invention claimed is:

1. A round plug connector (1) for detachably connecting lines, comprising:

a housing element (2) for receiving an insulating body (3) and at least one locking element (4) for detachably connecting to a mating plug connector (5), wherein the housing element (2) receives a circumferential spring element (6), wherein the spring element (6) is made of an electrically conductive material for connecting an electromagnetic shield, wherein the spring element (6) comprises a ring (8) held in a circumferential recess (7) of the housing element (2) and a substantially axially extending wing (9), wherein the spring element (6) has a number of wings (9) identical to a number of locking elements (4), the number being greater than or equal to two, and wherein the wings (9) of the spring element (6) and the locking elements (4) alternate circumferentially at the circumference of the housing element (2).

2. The round plug connector (1) as claimed in claim 1, wherein the wing (9) is oriented against a plug-in direction (RS) of the round plug connector (1), so that the ring (8) points in a direction of the mating plug connector (5).

3. The round plug connector (1) as claimed in claim 1, wherein the wing (9) has a concave curvature which extends substantially outside an imaginary cylinder a base of which is formed by an inner diameter ($d_I$) of the ring (8).

4. The round plug connector (1) as claimed in claim 1, wherein the wing (9) has a concave curvature, of which a maximum deflection is substantially outside an imaginary cylinder a base of which is formed by an outer diameter ($d_A$) of the ring (8).

5. The round plug connector (1) as claimed in claim 1, wherein the spring element (6) is electrically conductively connected to the housing element (2) through the ring (8) and is electrically conductively connected to the mating plug connector (5) with a deflection of the wing (9).

6. The round plug connector (1) as claimed in claim 1, wherein the spring element (6) is electrically conductively connected to the housing element (2) through the ring (8) and an end region of the wing (9) and is electrically conductively connected to the mating plug connector (5) with a deflection of the wing (9).

7. The round plug connector (1) as claimed in claim 1, wherein the wing (9) is arranged on the ring (8) deformed by at least 60° against a plug-in direction (RS).

8. The round plug connector (1) as claimed in claim 1, wherein the spring element (6) is arranged in a recess (7) in the housing element (2), and wherein the ring (8) is inserted in a further recess (7') in the housing element (2).

* * * * *